Figure 1:
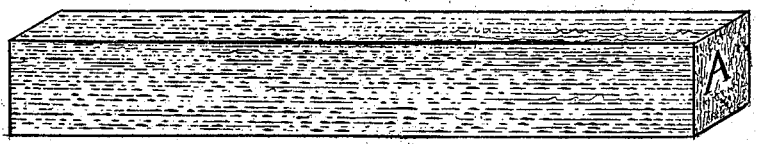

J. A. HATHAWAY.
FIRE-KINDLING ROD.

No. 173,721.  Patented Feb. 22, 1876.

UNITED STATES PATENT OFFICE.

JAMES A. HATHAWAY, OF ACUSHNET, MASSACHUSETTS.

IMPROVEMENT IN FIRE-KINDLING RODS.

Specification forming part of Letters Patent No. 173,721, dated February 22, 1876; application filed January 7, 1876.

*To all whom it may concern:*

Be it known that I, JAMES A. HATHAWAY, of Acushnet, in the county of Bristol, in the State of Massachusetts, have invented new and useful Improved Fire-Kindling Rods, which improvement is fully set forth in the following specification.

It consists in rods of wood saturated with crude petroleum-oil, coated with an inflammable composition to prevent the petroleum from evaporating, and to assist combustion, composed of rosin, tallow, pulverized charcoal, and crude petroleum-oil, in the following proportions, viz: ten pounds rosin, one pound tallow, one-quarter pound pulverized charcoal, and one-half pint crude petroleum-oil.

The proportions of the within compound may be varied to produce the desired consistency, to conform to the course of manufacture.

Figure 1 is a perspective view of my invention.

A is a rod, nine inches long and about one inch square, which rod may be sawed or split of any practical size or length.

The mode of mixing the composition and of applying it to the rods I will now proceed to explain.

Melt the rosin; then add the oil, tallow, and charcoal; thoroughly mix.

I coat the saturated rods with the composition, and, when hot, roll them in finely-cut shavings and sawdust to render quick ignition.

What I claim is—

The within-described fire-kindling rods, consisting of inflammable wood, saturated with crude petroleum-oil, or its equivalent, coated with the within-described composition, and rolled in finely-cut shavings and sawdust, as and for the purpose set forth and described.

JAMES A. HATHAWAY.

Witnesses:
JNO. DAVIS,
CHARLES F. KEEN.